(12) United States Patent
Nose et al.

(10) Patent No.: US 11,933,331 B2
(45) Date of Patent: Mar. 19, 2024

(54) CONTROL DEVICE AND HYDRAULIC SYSTEM INCLUDING THE SAME

(71) Applicant: KAWASAKI JUKOGYO KABUSHIKI KAISHA, Kobe (JP)

(72) Inventors: Tomomichi Nose, Kobe (JP); Hayato Kawasaki, Kobe (JP); Hideyasu Muraoka, Kobe (JP); Nobuyuki Kinoshita, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/906,409

(22) PCT Filed: Mar. 4, 2021

(86) PCT No.: PCT/JP2021/008420
§ 371 (c)(1),
(2) Date: Sep. 15, 2022

(87) PCT Pub. No.: WO2021/187132
PCT Pub. Date: Sep. 23, 2021

(65) Prior Publication Data
US 2023/0175536 A1    Jun. 8, 2023

(30) Foreign Application Priority Data

Mar. 17, 2020 (JP) ................ 2020-046638

(51) Int. Cl.
*F15B 21/08* (2006.01)
*F15B 11/08* (2006.01)
(Continued)

(52) U.S. Cl.
CPC .......... *F15B 21/08* (2013.01); *G05D 7/0635* (2013.01); *F15B 11/08* (2013.01); *F15B 13/0433* (2013.01);
(Continued)

(58) Field of Classification Search
CPC .... Y10T 137/7761; F15B 21/08; F15B 11/08; F15B 13/0433; F15B 2211/30525;
(Continued)

(56) References Cited

U.S. PATENT DOCUMENTS 4,724,865 A * 2/1988 Hirano ................. G05D 7/0635
137/486
4,858,172 A * 8/1989 Stern .................... G05D 7/0676
417/18
(Continued)

FOREIGN PATENT DOCUMENTS

JP    2003167604 A    6/2003
JP     201897759 A    6/2018

*Primary Examiner* — William M McCalister
(74) *Attorney, Agent, or Firm* — Alleman Hall & Tuttle LLP (57) ABSTRACT

A control device controls movement of a valve body of a valve device and estimates a flow rate of the valve device; determines, on the basis of an input target flow rate value and the flow rate estimate, whether or not the flow of an operating fluid in the valve device is in a transient flow state; calculates an opening command on the basis of the target flow rate value and an upstream-downstream pressure difference of the valve device; and controls the movement of the valve body. When the control device determines that the flow is not in the transient flow state, it controls the movement of the valve body on the basis of the opening command, and when the control determines that the flow is in the transient flow state, it controls the movement of the valve body on the basis of the target flow rate value.

8 Claims, 5 Drawing Sheets

(51) Int. Cl.
*F15B 13/043* (2006.01)
*G05D 7/06* (2006.01)

(52) U.S. Cl.
CPC ............... *F15B 2211/30525* (2013.01); *F15B 2211/3144* (2013.01); *F15B 2211/327* (2013.01); *F15B 2211/351* (2013.01); *F15B 2211/6309* (2013.01); *F15B 2211/6313* (2013.01); *F15B 2211/6346* (2013.01); *F15B 2211/6656* (2013.01); *F15B 2211/6657* (2013.01); *G05D 7/0623* (2013.01)

(58) Field of Classification Search
CPC ........ F15B 2211/3144; F15B 2211/327; F15B 2211/351; F15B 2211/6309; F15B 2211/6313; F15B 2211/6346; F15B 2211/6656; F15B 2211/6657; G05D 7/0635
USPC ...................................................... 137/487.5
See application file for complete search history.

(56) References Cited

U.S. PATENT DOCUMENTS

| | | | |
|---|---|---|---|
| 8,166,999 B2* | 5/2012 | Ueki | G01F 1/667 137/487.5 |
| 10,754,361 B2* | 8/2020 | Takijiri | H01L 21/67017 |
| 2004/0055454 A1* | 3/2004 | Pfaff | F15B 21/082 91/433 |
| 2013/0103209 A1* | 4/2013 | Beck | G05B 11/06 700/282 |
| 2014/0007950 A1* | 1/2014 | Takijiri | G05D 16/20 137/485 |
| 2015/0370261 A1* | 12/2015 | Yokoyama | G05D 7/0635 700/282 |
| 2016/0124440 A1* | 5/2016 | Takijiri | G05D 7/0635 137/455 |
| 2018/0009471 A1* | 1/2018 | Novacek | B62D 5/062 |
| 2018/0173249 A1* | 6/2018 | Hayashi | G05D 7/0635 |
| 2018/0253112 A1* | 9/2018 | Matsuura | G05B 6/02 |
| 2023/0175536 A1* | 6/2023 | Nose | F15B 21/08 251/129.15 |

* cited by examiner

CONTROL DEVICE AND HYDRAULIC SYSTEM INCLUDING THE SAME

TECHNICAL FIELD

The present invention relates to a control device that controls movement of a valve body of a valve device included in a hydraulic system, and a hydraulic system including the control device.

BACKGROUND ART

A hydraulic system includes a control device. The control device controls movement of a valve body of a valve device, for example, a spool of a spool valve, in the hydraulic system. Known examples of such a control device include the control device disclosed in Patent Literature (PTL) 1. The control device disclosed in PTL 1 performs feedback control on a position control signal on the basis of a spool position detected by a sensor circuit.

CITATION LIST

Patent Literature

PTL 1: Japanese Laid-Open Patent Application Publication No. 2003-167604

SUMMARY OF INVENTION

Technical Problem

The control device disclosed in PTL 1 controls the spool position, but there is also a control device that controls the flow rate of the valve device. In the case of such a control device, the opening of the valve body, in other words, a spool position command, is calculated on the basis of a target flow rate value and an actual flow rate. For example, the spool position command is calculated on the basis of a relational expression between a flow rate and a pressure loss. The relational expression between the flow rate and the pressure loss holds when the flow state of an operating fluid in the valve device is a steady flow state or a quasi-steady flow state. Therefore, the conventional control device ensures stable flow rate control mainly in the steady flow state or the quasi-steady flow state.

Thus, an object of the present invention is to provide a control device capable of increasing the stability of flow rate control in a transient flow state.

Solution to Problem

A control device according to the present invention controls movement of a valve body of a valve device and includes: a flow rate obtainment unit that obtains a flow rate of the valve device; a flow state determination unit that determines, on the basis of a target flow rate value and a flow rate estimate, whether or not a flow of an operating fluid in the valve device is in a transient flow state, the target flow rate value being input to the flow state determination unit, the flow rate estimate being estimated in the flow rate obtainment unit; an opening command calculation unit that calculates an opening command on the basis of the target flow rate value and an upstream-downstream pressure difference of the valve device; and a valve body control unit that controls the movement of the valve body. When the flow state determination unit determines that the flow is not in the transient flow state, the valve body control unit controls the movement of the valve body on the basis of the opening command, and when the flow state determination unit determines that the flow is in the transient flow state, the valve body control unit controls the movement of the valve body on the basis of the target flow rate value.

According to the present invention, the method for controlling the valve body is differentiated between the transient flow state and the non-transient flow state, that is, the steady flow state or the quasi-steady flow state, and thus it is possible to increase the stability of flow rate control in the transient flow state.

A hydraulic system according to the present invention includes; the aforementioned control device; and the valve device including at least one electromagnetic proportional valve and a spool valve. The spool valve includes a spool that is the valve body. The spool travels according to a pilot pressure acting on the spool. The electromagnetic proportional valve outputs the pilot pressure acting on the spool. When the flow state determination unit determines that the flow is not in the transient flow state, the valve body control unit controls the movement of the valve body by causing the electromagnetic proportional valve to output the pilot pressure that corresponds to the opening command, and when the flow state determination unit determines that the flow is in the transient flow state, the valve body control unit controls the movement of the valve body by causing the electromagnetic proportional valve to output the pilot pressure that corresponds to the target flow rate value.

According to the present invention, it is possible to provide a hydraulic system in which the flow rate control in the transient flow state is more stable.

Advantageous Effects of Invention

With the present invention, it is possible to increase the stability of flow rate control in the transient flow state.

The above object, other objects, features, and advantages of the present invention will be made clear by the following detailed explanation of preferred embodiments with reference to the attached drawings.

DESCRIPTION OF EMBODIMENTS

Hereinafter, a hydraulic system 1 and a control device 17 according to an embodiment of the present invention will be described with reference to the aforementioned drawings. Note that the concept of directions mentioned in the following description is used for the sake of explanation; the orientations, etc., of elements according to the present invention are not limited to these directions. Each of the hydraulic system 1 and the control device 17 described below is merely one embodiment of the present invention. Thus, the present invention is not limited to the following embodiment and may be subject to addition, deletion, and alteration within the scope of the essence of the present invention.

Construction equipment includes a hydraulic actuator and the hydraulic system 1 in order to move elements. The hydraulic actuator is a hydraulic cylinder 2 such as that shown in FIG. 1, for example. The hydraulic cylinder 2 is attached so as to correspond to the elements of the construction equipment. The hydraulic cylinder 2 can expand and contract to actuate the corresponding elements. More specifically, the hydraulic cylinder 2 includes a rod-end port 2a and a head-end port 2b. As a result of the supply of an operating fluid to each of the ports 2a, 2b, the hydraulic cylinder 2 expands and contracts.

Figure 1:
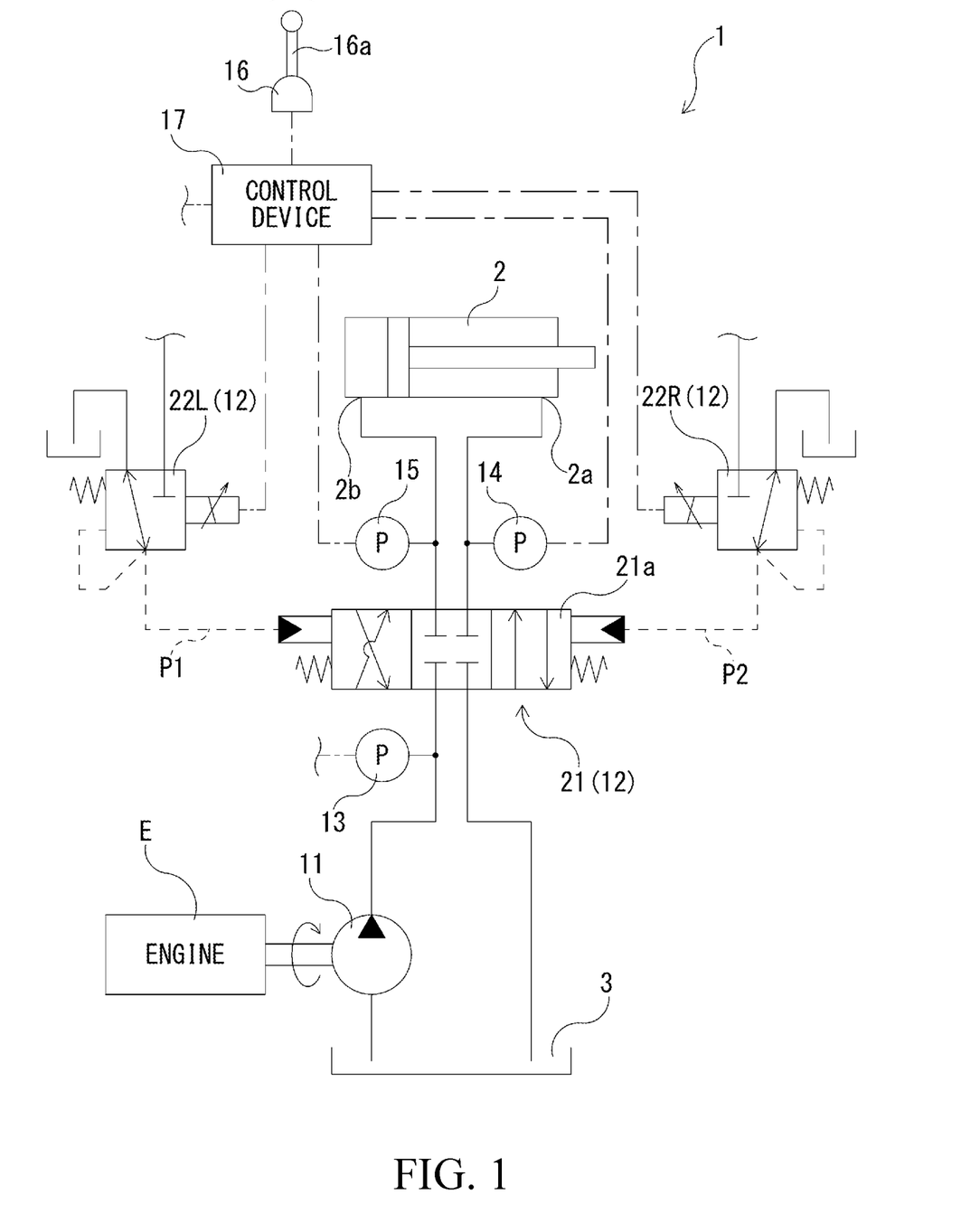
FIG. 1 is a hydraulic circuit diagram showing a hydraulic system according to an embodiment of the present invention.

The hydraulic system 1 is capable of supplying the operating fluid to the hydraulic cylinder 2. The hydraulic system 1 is capable of expanding and contracting the hydraulic cylinder 2 by supplying the operating fluid to the hydraulic cylinder 2. The hydraulic system 1 having such a function includes a hydraulic pump 11, a valve device 12, three pressure sensors 13 to 15, an operation device 16, and a control device 17, for example.

The hydraulic pump 11 is capable of discharging the operating fluid. More specifically, a drive source is connected to the hydraulic pump 11. The drive source is an engine E and an electric motor. In the present embodiment, the drive source is the engine E. The hydraulic pump 11 is rotationally driven by the engine E to discharge the operating fluid. Note that the hydraulic pump 11 is a swash plate pump or a bent axis pump in the present embodiment.

The valve device 12 is interposed between the hydraulic pump 11 and the hydraulic cylinder 2. The valve device 12 can control, according to a motion command that is input thereto, the direction and flow rate of the operating fluid flowing from the hydraulic pump 11 to the hydraulic cylinder 2. Specifically, the valve device 12 is capable of switching the flow direction of the operating fluid so as to direct the operating fluid to one of the two ports 2a, 2b of the hydraulic cylinder 2, and also capable of blocking the flow of the operating fluid to the two ports 2a, 2b. More specifically, the valve device 12 is an electronically controlled spool valve. The valve device 12 includes a directional control valve 21 and two electromagnetic proportional control valves 22L, 22R.

The directional control valve 21 is connected to the hydraulic pump 11, the rod-end port 2a and the head-end port 2b of the hydraulic cylinder 2, and a tank 3. The directional control valve 21 is capable of switching the connection between the hydraulic pump 11, the rod-end port 2a and the head-end port 2b of the hydraulic cylinder 2, and the tank 3 (specifically, allowing or blocking communication between these elements). Thus, the flow from the hydraulic pump 11 to the hydraulic cylinder 2 changes. By changing the flow in this manner, the directional control valve 21 can expand and contract the hydraulic cylinder 2. Furthermore, the directional control valve 21 is capable of adjusting the size of the opening thereof, that is, the opening degree, for when the hydraulic pump 11 and the hydraulic cylinder 2 are in communication. This makes it possible to adjust the flow rate of the operating fluid flowing to the hydraulic cylinder 2. In other words, it is possible to adjust a speed at which the hydraulic cylinder 2 expands and contracts.

More specifically, the directional control valve 21 includes a spool 21a. The spool 21a is capable of switching the connection state by changing the position thereof (in other words, the stroke distance thereof). This means that the spool 21a is capable of connecting the hydraulic pump 11 to each of the rod-end port 2a and the head-end port 2b according to the position of the spool 21a. Furthermore, the spool 21a is capable of adjusting the opening degree according to the stroke distance (or the position) of the spool 21a. This makes it possible to adjust the flow rate of the operating fluid flowing to the hydraulic cylinder 2. The spool 21a having such a function receives pilot pressures P1, P2 opposing each other and moves to a position corresponding to the pressure difference between the two pilot pressures P1, P2.

The first electromagnetic proportional control valve 22L and the second electromagnetic proportional control valve 22R, each of which is one example of the electromagnetic proportional valve, output the first pilot pressure P1 and the second pilot pressure P2, respectively, which correspond to signals (in the present embodiment, electric currents or voltages) that are input to the first and second electromagnetic proportional control valves 22L, 22R. The first pilot pressure P1 and the second pilot pressure P2 that are output are brought to the spool 21a. More specifically, the first and second electromagnetic proportional control valves 22L, 22R are connected to pilot pumps not shown in the drawings. The first and second electromagnetic proportional control valves 22L, 22R adjust the operating fluid discharged from the pilot pumps so that the pressure of the operating fluid corresponds to the signals, and then output the operating fluid to the spool 21a.

The three pressure sensors 13 to 15 detect hydraulic pressures upstream and downstream of the directional control valve 21. More specifically, the first pressure sensor 13 is provided corresponding to a channel connecting the directional control valve 21 and the hydraulic pump 11. The second pressure sensor 14 is provided corresponding to a channel connecting the directional control valve 21 and the rod-end port 2a of the hydraulic cylinder 2. The third pressure sensor 15 is provided corresponding to a channel connecting the directional control valve 21 and the head-end port 2b. Each of the pressure sensors 13 to 15 detects the hydraulic pressure of the corresponding channel. Subsequently, each of the pressure sensors 13 to 15 outputs the detected hydraulic pressure to the control device 17.

The operation device 16 outputs an operation command to the control device 17 in order to actuate the hydraulic cylinder 2. The operation device 16 is an operation valve or an electric joystick, for example. More specifically, the operation device 16 includes an operation lever 16a, which is one example of the operation tool. The operation lever 16a is configured in such a manner that an operator can operate the operation lever 16a. For example, the operation lever 16a is configured to be able to swing. The operation device 16 outputs, to the control device 17, the operation command that corresponds to the amount of operation (in the present embodiment, the amount of swing) of the operation lever 16a.

The control device 17 is connected to the pressure sensors 13 to 15, two electromagnetic proportional control valves 22L, 22R, and the operation device 16. The control device 17 controls the motion of the spool 21a of the valve device 12 according to the operation command from the operation device 16. More specifically, the control device 17 calculates the motion command on the basis of the results of detection of the pressure sensors 13 to 15 and the operation command from the operation device 16. The motion command is a pressure command for controlling the motion of the spool 21*a* of the valve device 12. In the present embodiment, the motion command is a pressure command to be described later. The control device 17 outputs, to the electromagnetic proportional control valves 22L, 22R, signals each corresponding to the pressure command. Thus, the electromagnetic proportional control valves 22L, 22R output the pilot pressures P1, P2 each corresponding to the pressure command. Thus, the motion of the spool 21*a* of the valve device 12 is controlled according to the operation command.

Figure 2:
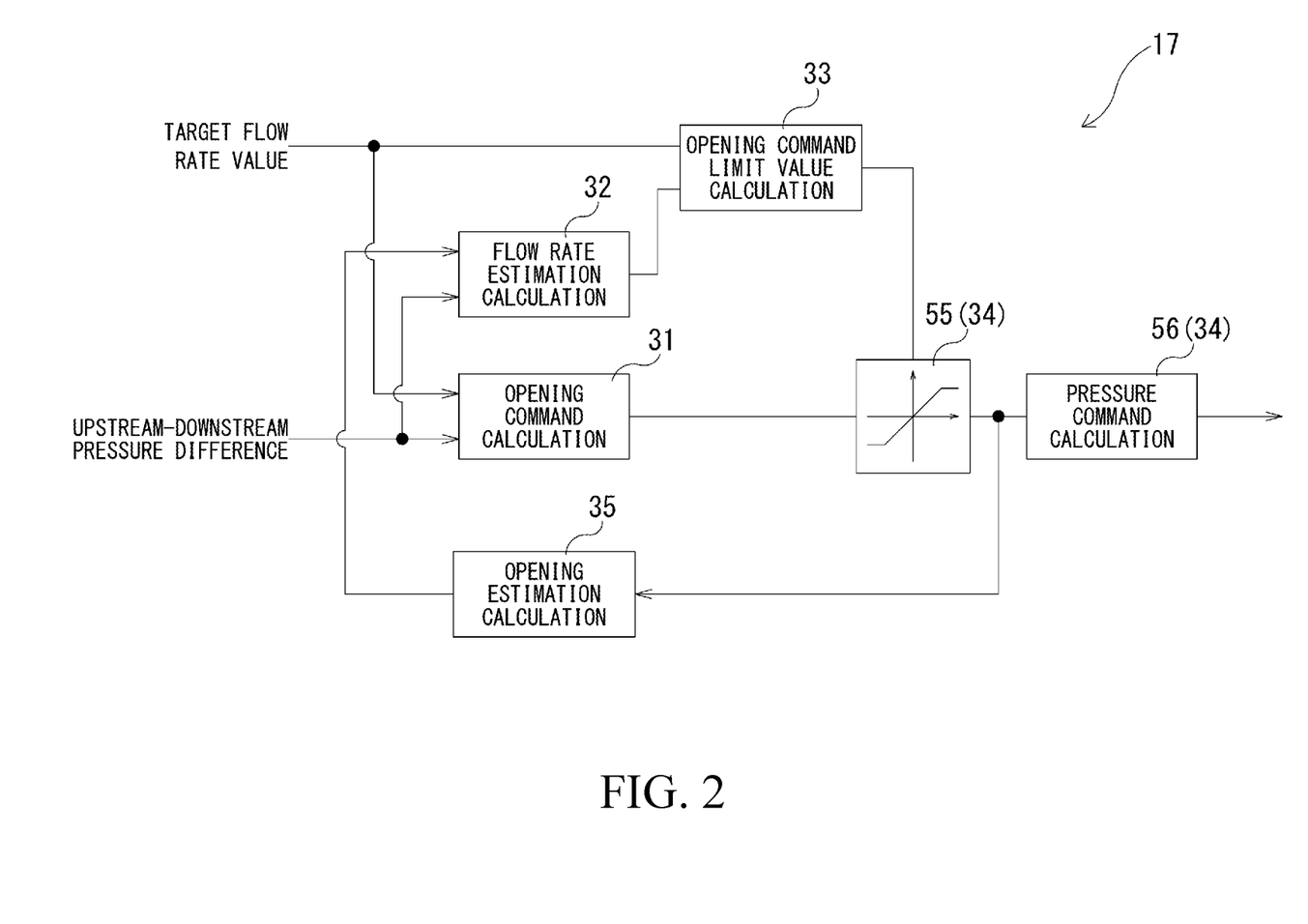
FIG. 2 is a block diagram of a control device included in the hydraulic system shown in FIG. 1.

More specifically, the control device 17 obtains a target flow rate value and an upstream-downstream pressure difference of the valve device 12 in order to calculate the motion command. The target flow rate value is a target value of the flow rate of the operating fluid flowing to the hydraulic cylinder 2. In the present embodiment, the control device 17 sets the target flow rate value on the basis of the operation command from the operation device 16. Meanwhile, the upstream-downstream pressure difference of the valve device 12 (that is, the upstream-downstream pressure difference of the directional control valve 21) is the difference between the pressures upstream and downstream of the valve device 12 (more specifically, the directional control valve 21) in the channel connecting the hydraulic pump 11 and the hydraulic cylinder 2 via the valve device 12. The control device 17 calculates the upstream-downstream pressure difference of the directional control valve 21 on the basis of the signals from the three pressure sensors 13 to 15. The control device 17 includes an opening command calculation unit 31, a flow rate estimation calculation unit 32, an opening command limit value calculation unit 33, a valve body control unit 34, and an opening estimation calculation unit 35 in order to calculate the motion command.

The opening command calculation unit 31 calculates an opening command for the directional control valve 21 on the basis of the calculated target flow rate value and the calculated upstream-downstream pressure difference of the directional control valve 21. The opening command indicates an opening degree at which the directional control valve 21 is to be open. In the present embodiment, the opening command calculation unit 31 calculates an opening degree at which the operating fluid can flow from the directional control valve 21 to the hydraulic cylinder 2 at a flow rate having the target flow rate value.

The flow rate estimation calculation unit 32, which is one example of the flow rate obtainment unit, calculates, on the basis of the calculated upstream-downstream pressure difference of the directional control valve 21 and an estimated opening degree to be described later, an estimate of the flow rate of the operating fluid flowing through the directional control valve 21, namely, a flow rate estimate.

The opening command limit value calculation unit 33 determines a flow state of the operating fluid in the directional control valve 21 on the basis of the calculated flow rate estimate and the calculated target flow rate value. Note that the flow state of the operating fluid to be determined includes a steady flow state, a quasi-steady flow state, and a transient flow state. Furthermore, the opening command limit value calculation unit 33 calculates an opening command limit value according to the determined flow state. Note that the opening command limit value is a limit value (upper limit value) to be applied to limit the opening command by the valve body control unit 34 to be described in detail later. Furthermore, the opening command limit value calculation unit 33 causes the limit value to smoothly change at the transition from the transient flow state to the steady flow state or the quasi-steady flow state (hereinafter referred to as "the steady flow state or the like").

Figure 3:
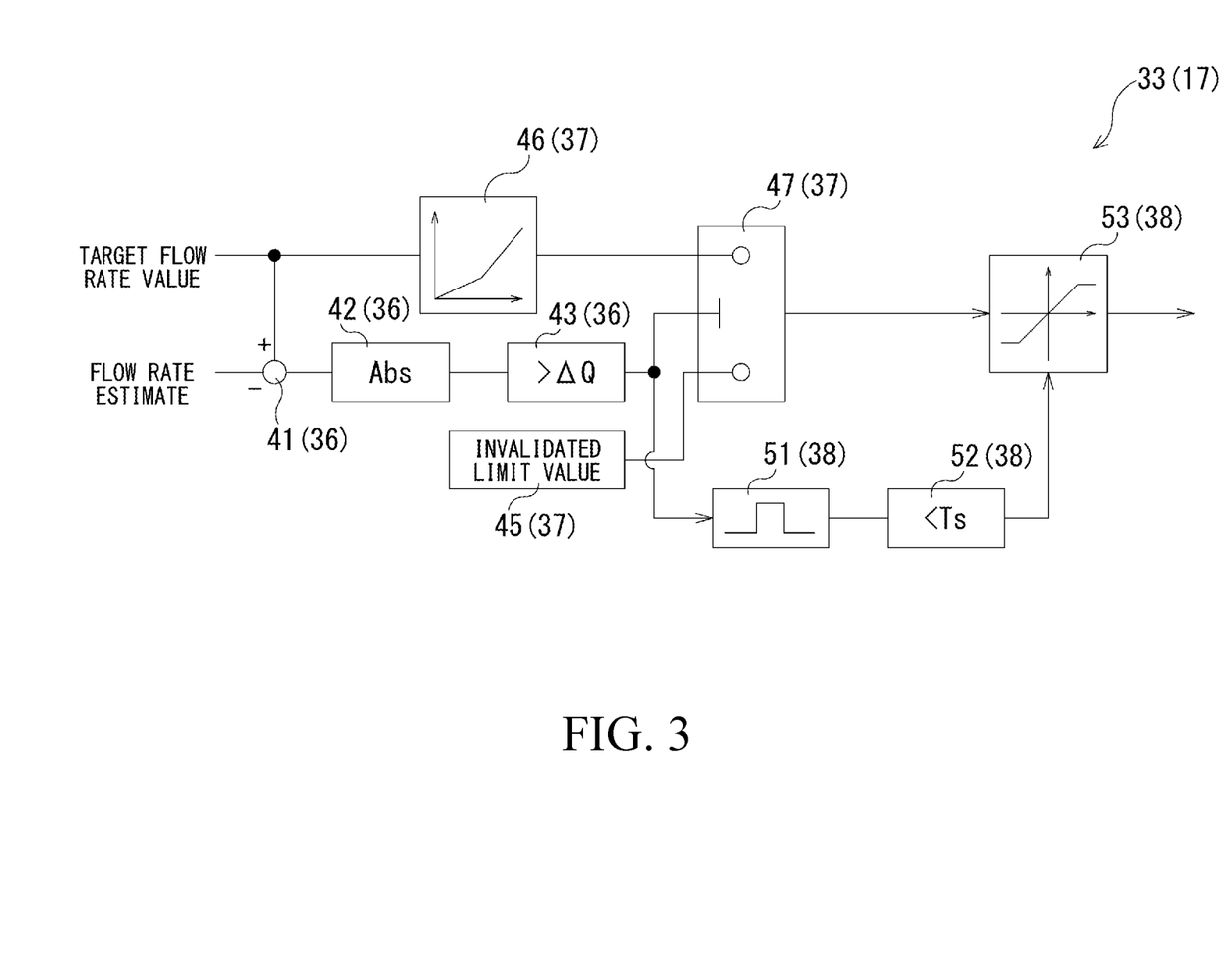
FIG. 3 is a block diagram more specifically showing the opening command limit value calculation unit shown in FIG. 2.

The opening command limit value calculation unit 33 includes a flow state determination unit 36, a limit value selection unit 37, and a change rate limiting unit 38. Note that the flow state determination unit 36 does not necessarily need to be included in the opening command limit value calculation unit 33. In other words, the flow state determination unit 36 may be independent of the opening command limit value calculation unit 33.

The flow state determination unit 36 determines a flow state of the operating fluid in the directional control valve 21 on the basis of the calculated flow rate estimate and the calculated target flow rate value. In the present embodiment, the flow state determination unit 36 determines a flow state according to whether the difference between the calculated flow rate estimate and the calculated target flow rate value is within a predetermined range or outside the predetermined range. More specifically, the flow state determination unit 36 determines whether or not the flow state is the transient flow state by determining whether or not the absolute value of the difference (hereinafter referred to as "the absolute difference value") is less than a predetermined difference flow rate $\Delta Q$. The flow state determination unit 36 having such a function includes a subtractor 41, an absolute value calculator 42, and a first comparator 43 in the present embodiment.

The subtractor 41 calculates a difference between the target flow rate value and the flow rate estimate. The absolute value calculator 42 calculates the absolute difference value on the basis of the calculated difference. The first comparator 43 determines whether or not the calculated absolute difference value is less than the predetermined difference flow rate $\Delta Q$. Subsequently, when the first comparator 43 determines that the absolute difference value is less than the difference flow rate $\Delta Q$, the flow state is determined as the steady flow state or the quasi-steady flow state. Conversely, when the first comparator 43 determines that the absolute difference value is greater than or equal to the difference flow rate $\Delta Q$, the flow state is determined as the transient flow state. Thus, by using the absolute difference value, the flow state determination unit 36 can easily determine the flow state.

The limit value selection unit 37 selects an opening command limit value on the basis of the determination made by the flow state determination unit 36. More specifically, when the flow state is determined as the steady flow state or the like, the limit value selection unit 37 invalidates the limit value. In the present embodiment, the limit value selection unit 37 invalidates the limit value by setting the maximum opening value to the limit value. On the other hand, when the flow state is determined as the transient flow state, the limit value selection unit 37 sets the limit value (<the maximum opening value) on the basis of the target flow rate value. The limit value selection unit 37 having such a function includes a limit invalidator 45, a limit value calculator 46, and a selector 47 in the present embodiment.

The limit invalidator 45 sets the maximum opening value (invalided limit value) to the limit value (specifically, the upper limit value and the lower limit value). On the other hand, the limit value calculator 46 calculates a limit value on the basis of the calculated target flow rate value as a calculated limit value. In the present embodiment, the association between the target flow rate value and the limit value is set in advance in the limit value calculator 46. The limit value calculator 46 calculates a limit value (calculated limit value) on the basis of this association. Subsequently, the selector 47 selects one of the invalided limit value and the calculated limit value as a selected limit value on the basis of the flow state determined by the flow state determination unit 36. For example, when the flow state is determined as the steady flow state or the like, the selector 47 selects the invalidated limit value as the selected limit value. On the other hand, when the flow state is determined as the transient flow state, the selector 47 selects the calculated limit value as the selected limit value.

The change rate limiting unit 38 adjusts the limit value so as to make the change in the opening command smooth at the transition from the transient flow state to the steady flow state or the quasi-steady flow state (hereinafter referred to as "the steady flow state or the like"). In the present embodiment, the change rate limiting unit 38 limits the rate of change in the limit value to no greater than a predetermined limited rate of change during predetermined time Ts after the flow state is switched as described above. The change rate limiting unit 38 having such a function includes a timer 51, a second comparator 52, and a change rate limiter 53 in the present embodiment.

The timer 51 measures the time elapsed from when the flow state that is determined by the flow state determination unit 36 is switched. More specifically, on the basis of output of the first comparator 43, the timer 51 starts measuring the elapsed time. This means that when the first comparator 43 determines that the absolute difference value is less than or equal to the difference flow rate ΔQ after determining that the absolute difference value is greater than or equal to the difference flow rate ΔQ, the measurement of the elapsed time starts. The second comparator 52 determines whether or not the elapsed time measured by the timer 51 is less than the predetermined time Ts.

When the second comparator 52 determines that the elapsed time is less than the predetermined time Ts, the change rate limiter 53 limits the rate of change in the limit value to less than the limited rate of change. The change rate limiter 53 sets the limited limit value as a new limit value (setting limit value). On the other hand, when the second comparator 52 determines that the elapsed time is greater than or equal to the predetermined time Ts, the change rate limiter 53 invalidates the limitation regarding the rate of change in the limit value. In other words, the change rate limiter 53 sets the selected limit value directly as the setting limit value.

More specifically, the change rate limiter 53 sets the next setting limit value so that the rate of change in the selected limit value relative to the immediately preceding setting limit value becomes less than or equal to the limited rate of change. This means that at least the immediately preceding setting limit value is stored in the change rate limiter 53. The change rate limiter 53 calculates the rate of change in the calculated limit value relative to the immediately preceding setting limit value. When the rate of change is greater than or equal to the limited rate of change, the change rate limiter 53 sets, as the next setting limit value, a value obtained by adding the product of the limited rate of change and Δt to the immediately preceding setting limit value (for example, refer to the solid line between time t0 and time t3 and the dash-dot-dot-dot-dash line from time t3 onward in (b) in FIG. 4 to be described later). In the present embodiment, the limited rate of change is the amount of change per unit time, and Δt seconds are a calculation interval at which the setting limit value is calculated. On the other hand, when the rate of change is less than the limited rate of change, the selected limit value is set as the setting limit value. Note that when the elapsed time is greater than or equal to the predetermined time Ts, the change rate limiter 53 sets the selected limit value directly as the setting limit value, as mentioned above.

The valve body control unit 34 controls movement of the valve body according to the flow state determined by the flow state determination unit 36 of the opening command limit value calculation unit 33. Specifically, when the flow state is not determined as the transient flow state, that is, when the flow state is determined as the steady flow state or the like, the valve body control unit 34 controls the movement of the spool 21a on the basis of the opening command calculated by the opening command calculation unit 31. On the other hand, when the flow state is determined as the transient flow state, the valve body control unit 34 controls the movement of the spool 21a on the basis of the target flow rate value. Note that in the present embodiment, the valve body control unit 34 controls the movement of the spool 21a on the basis of one of the opening command and the target flow rate value in each state by limiting the opening command according to the flow state. The valve body control unit 34 having such a function includes an opening command limiting part 55 and a pressure command calculating part 56 in the present embodiment.

The opening command limiting part 55 limits the opening command on the basis of the setting limit value that is set by the opening command limit value calculation unit 33. Specifically, when the flow state is the steady flow state or the like and the elapsed time is greater than or equal to the predetermined time Ts, the opening command limit value calculation unit 33 sets, as the setting limit value, the maximum opening value that is the validated limit value. In this case, the opening command that is calculated by the opening command calculation unit 31 becomes less than or equal to the setting limit value, and thus the opening command limiting part 55 outputs the opening command directly as an output command. Note that the determination conditions do not necessarily need to include the elapsed time. On the other hand, when the flow state is the transient flow state, the opening command limit value calculation unit 33 sets, as the setting limit value, the calculated limit value that is the selected limit value. The calculated limit value that is a limit value calculated on the basis of the target flow rate value is smaller than the opening command, for example. In this case, the opening command limiting part 55 limits the opening command to the setting limit value. This means that the opening command limiting part 55 outputs an output command corresponding to the target flow rate value. Note that the setting limit value increases on the basis of the limited rate of change in the period before the elapsed time reaches the predetermined time Ts. Thus, the opening command limiting part 55 outputs the output command in the state where the rate of change thereof is kept less or equal to the limited rate of change (refer to time t2 to time t4 in (b) in FIG. 4).

The pressure command calculating part 56 calculates a pressure command on the basis of the output command that is output from the opening command limiting part 55. The pressure command, which is one example of the operation command, is a command for adjusting the opening degree of the directional control valve 21 to the opening degree corresponding to the output command. In the present embodiment, the pressure command is a command value for causing the electromagnetic proportional control valves 22L, 22R to output the pilot pressures P1, P2 in order to adjust the opening degree. This means that the pressure command calculating part 56 calculates the command values of the pilot pressures P1, P2 according to the output command. Thus, the movement of the spool 21a is controlled according to the pressure command.

More specifically, when the flow state is the steady flow state or the like, the opening command is output directly as the output command. Therefore, the pressure command calculating part 56 calculates the first pressure command (first operation command) on the basis of the opening command. Subsequently, the pressure command calculating part 56 outputs, to the electromagnetic proportional control valves 22L, 22R, signals corresponding to the first pressure command. Thus, when the flow state is the steady flow state or the like, the motion of the spool 21a is controlled on the basis of the opening command. On the other hand, when the flow state is the transient flow state, the output command corresponding to the calculated limit value is output. Therefore, the pressure command calculating part 56 calculates the second pressure command (second operation command) on the basis of the calculated limit value. The calculated limit value is set on the basis of the target flow rate value. Therefore, the pressure command calculating part 56 calculates the pressure command on the basis of the target flow rate value. Subsequently, the pressure command calculating part 56 outputs, to the electromagnetic proportional control valves 22L, 22R, signals corresponding to the second pressure command. Thus, when the flow state is the transient flow state, the motion of the spool 21a is controlled on the basis of the target flow rate value.

When the elapsed time is less than the predetermined time Ts, the rate of change in the setting limit value is less than or equal to the limited rate of change. This allows the pressure command to transition at a rate of change less than or equal to the limited rate of change upon switching of the pressure command from the first pressure command to the second pressure command.

The opening estimation calculation unit 35, which is one example of the opening degree obtainment unit, estimates the opening degree of the directional control valve 21, in other words, obtains the estimated opening degree, on the basis of the output value from the opening command limiting part 55. More specifically, the opening estimation calculation unit 35 estimates the stroke distance of the spool 21a on the basis of the output command from the opening command limiting part 55. Furthermore, the opening estimation calculation unit 35 obtains the estimated opening degree from the stroke distance. The estimated opening degree that has been obtained is used by the flow rate estimation calculation unit 32 to calculate the flow rate estimate. Note that the opening estimation calculation unit 35 may be an observer.

The control device 17 configured as described above performs the following control when the operation lever 16a of the operation device 16 is operated. Specifically, the control device 17 calculates the target flow rate value on the basis of the operation amount of the operation lever 16a. The control device 17 calculates the upstream-downstream pressure difference of the directional control valve 21 on the basis of the pressures detected by the three pressure sensors 13 to 15. Next, in the control device 17, the opening command calculation unit 31 calculates the opening command on the basis of the target flow rate value and the upstream-downstream pressure difference of the directional control valve 21. The flow rate estimation calculation unit 32 calculates the flow rate estimate on the basis of the estimated opening degree and the upstream-downstream pressure difference of the directional control valve 21. The opening command limit value calculation unit 33 determines a flow state on the basis of the calculated flow rate estimate and the calculated target flow rate value. Furthermore, the opening command limit value calculation unit 33 sets the setting limit value according to the flow state and the elapsed time. The valve body control unit 34 limits the opening command according to the setting limit value. Furthermore, the valve body control unit 34 calculates the pressure command on the basis of the output command that is the limited opening command. Subsequently, the valve body control unit 34 causes the electromagnetic proportional control valves 22L, 22R to output the pilot pressures P1, P2, each of which corresponds to the pressure command. Thus, the control device 17 can control the movement of the spool 21a according to the pressure command.

Figure 4:
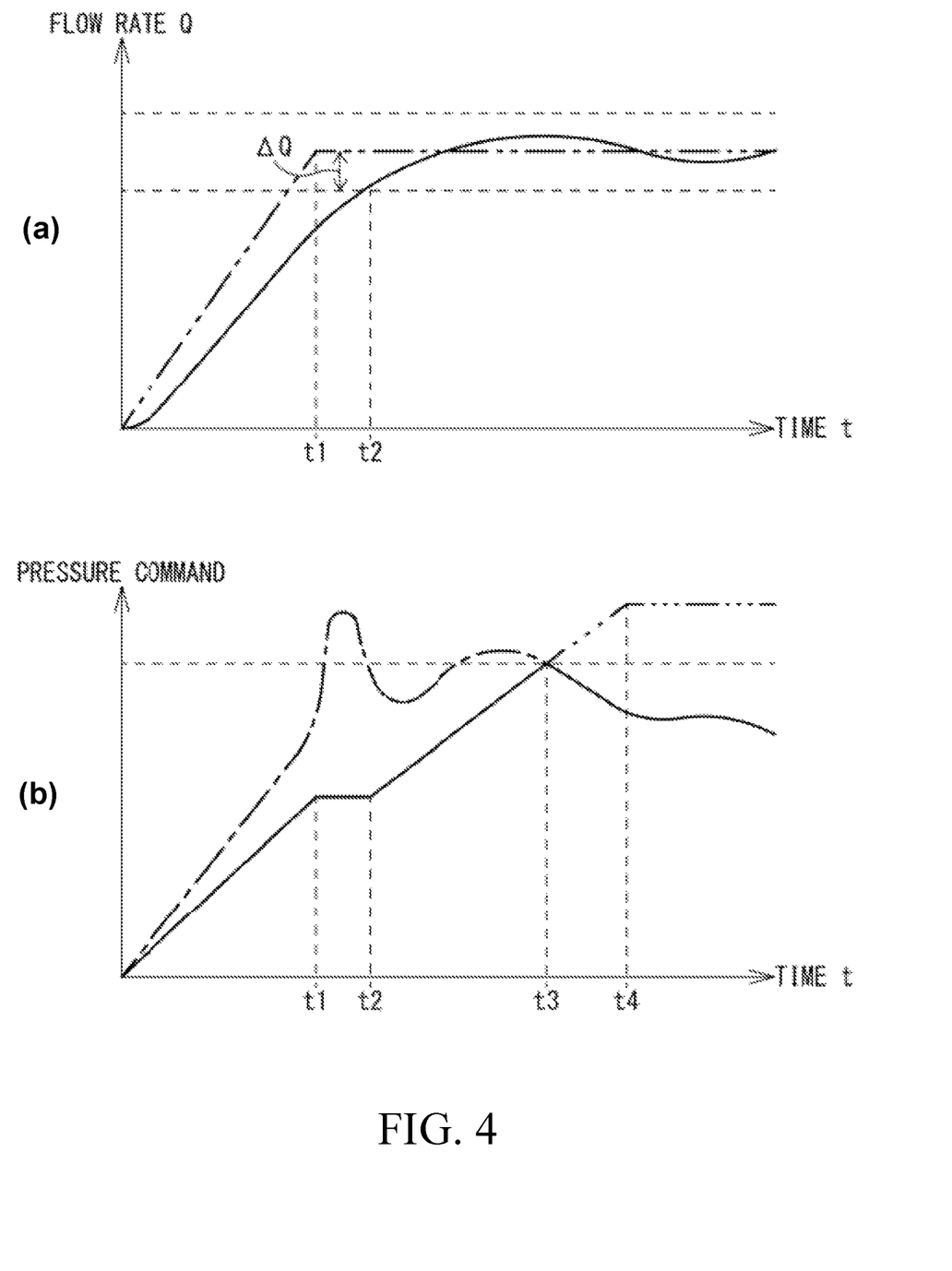
FIG. 4 shows, in (a), a graph of temporal changes in a target flow rate value and a flow rate estimate and shows, in (b), a graph of temporal changes in a conventional opening command and an opening command according to the present invention.

More specifically, for example, the operation lever 16a is operated so that the operating fluid is supplied from the hydraulic pump 11 to the hydraulic cylinder 2 at a flow rate temporally changing as indicated by the dash-dot-dot-dash line of the graph shown in FIG. 4. In other words, on the basis of the operation command from the operation device 16, the control device 17 sets a target flow rate value such as that indicated by the dash-dot-dot-dash line in FIG. 4. The target flow rate value significantly increases when the operation lever 16a at the neutral position is operated (refer to the dash-dot-dot-dash line between time t0 and time t1 in (a) in FIG. 4). Therefore, the absolute difference value between the flow rate estimate calculated by the flow rate estimation calculation unit 32 and the target flow rate value exceeds the predetermined difference flow rate $\Delta Q$. The flow state determination unit 36 of the opening command limit value calculation unit 33 determines that the flow state is the transient flow state. Accordingly, the limit value selection unit 37 selects the calculated limit value that is a limit value calculated on the basis of the target flow rate value. Furthermore, the change rate limiting unit 38 sets the calculated limit value as the setting limit value. The setting limit value is smaller than the opening command in the transient flow state (refer to the solid line and the dash-dot-dash line between time t0 and time t3 in (b) in FIG. 4). Therefore, the valve body control unit 34 calculates a pressure command on the basis of the output command obtained by limiting the opening command to the setting limit value. As described above, when the flow state is determined as the transient flow state, since the setting limit value is calculated on the basis of the target flow rate value, the pressure command is calculated on the basis of the target flow rate value. Therefore, the valve body control unit 34 controls the movement of the spool 21a on the basis of the target flow rate value (refer to the solid line between time t0 and time t3 in (b) in FIG. 4).

Next, when the operation lever 16a is stopped at a desired angle, the target flow rate value is maintained at a fixed flow rate (refer to the dash-dot-dot-dash line from time t1 onward in (a) in FIG. 4). For some time after maintaining, the absolute difference value is greater than or equal to the predetermined difference flow rate $\Delta Q$ (refer to the dash-dot-dot-dash line from time t1 onward in (a) in FIG. 4). Thus, the flow state determination unit 36 determines that the flow state is still the transient flow state. Accordingly, the output command is limited to no greater than the setting limit value, and the pressure command is set on the basis of the target flow rate value (refer to the solid line between time t1 and time t2 in (b) in FIG. 4).

Next, when the absolute difference value becomes less than the predetermined difference flow rate $\Delta Q$, the flow state determination unit 36 determines that the flow state has transitioned to the steady flow state or the like (refer to time t2 in (a) in FIG. 4). Accordingly, the timer 51 starts measuring the elapsed time. The setting limit value increases at a rate of change limited to no greater than the limited rate of change until the elapsed time reaches the predetermined time Ts. The valve body control unit 34 can smoothly increase the output command according to the limitation of the setting limit value, meaning that the valve body control unit 34 can smoothly increase the pressure command according to the limitation of the setting limit value. This makes it possible to minimize abrupt changes in the opening that are caused by sudden movement of the spool 21*a* upon switching of the determination about the flow state (refer to the solid line between time t2 and t3 in (b) in FIG. 4). In other words, it is possible to reduce the occurrence of rapid changes in the flow rate upon switching of the determination about the flow state. Thus, it is possible to minimize the impact that occurs in the directional control valve 21 due to rapid changes in the flow rate.

When the angle of the operation lever 16*a* is maintained constant even after switching of the flow state, the steady flow state continues. In this case, the pressure command increases at a predetermined rate of change, and thus the opening command eventually falls below the setting limit value (refer to time t3 in (b) in FIG. 4). As a result, the valve body control unit 34 sets the opening command directly as the output command. This means that the valve body control unit 34 calculates a pressure command on the basis of the opening command. Thus, the valve body control unit 34 controls the movement of the spool 21*a* on the basis of the opening command (refer to the solid line from time t3 onward in (b) in FIG. 4).

Furthermore, although not described in detail, the control device 17 performs substantially the same control when the operation lever 16*a* is returned to the neutral position. Specifically, the control device 17 controls the movement of the spool 21*a* on the basis of one of the opening command and the target flow rate value according to the determined flow state. Thus, at the time when the flow rate is reduced, it is possible to obtain substantially the same advantageous effects as those obtained when the flow rate is increased as described above.

Figure 5:
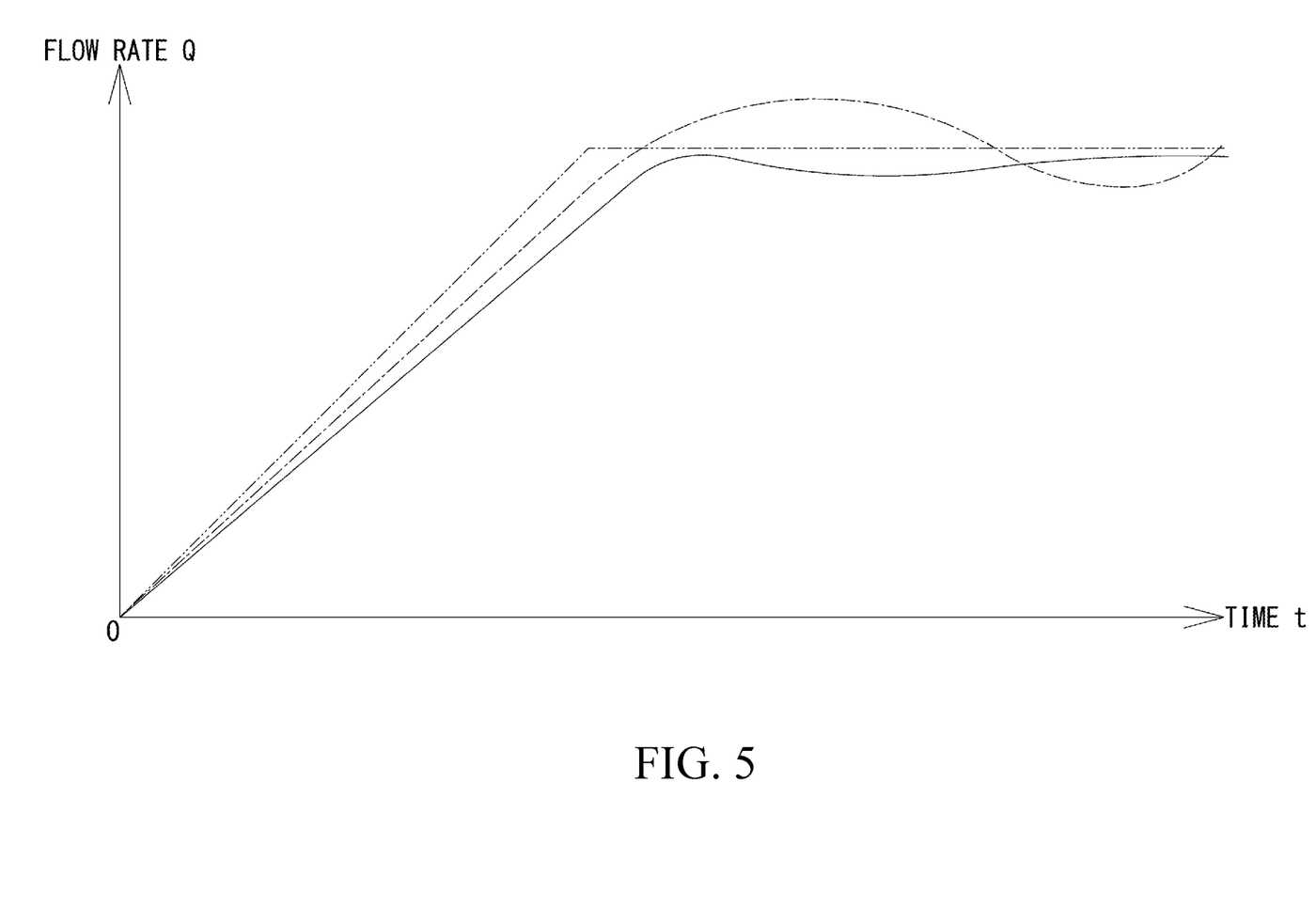
FIG. 5 is a graph of temporal changes in a conventional flow rate and a flow rate according to the present invention.

In the control device 17 of the hydraulic system 1 configured as described above, the method for controlling the spool 21*a* is differentiated between the transient flow state and the non-transient flow state, that is, the steady flow state or the like. This makes it possible to increase the stability of flow rate control in the transient flow state. Specifically, as shown in FIG. 5, with the conventional control for the target flow rate value (refer to the dash-dot-dot-dash line in FIG. 5), overshoot or the like occurs in the flow rate (refer to the dash-dot-dash line in FIG. 5). In contrast, with the control by the control device 17 according to the present invention, it is possible to reduce the occurrence of overshoot or the like (refer to the solid line in FIG. 5). This means that the control device 17 can increase the stability of flow rate control in the transient flow state.

Furthermore, in the control device 17, the flow rate estimate is calculated on the basis of the estimated opening degree obtained by the opening estimation calculation unit 35. The control device 17 determines the flow state on the basis of the calculated flow rate estimate. Therefore, the control device 17 can accurately determine the flow state. Thus, the flow of the operating fluid in the transient flow state can be controlled more stably.

Furthermore, in the control device 17, the valve body control unit 34 functions as follows. Specifically, when the flow state is the steady flow state or the like, the valve body control unit 34 controls the movement of the spool 21*a* on the basis of the opening command. The opening command is calculated on the basis of the upstream-downstream pressure difference of the directional control valve 21 and the target flow rate value. In other words, the valve body control unit 34 performs feedback control based on the opening command for control of the movement of the spool 21*a*. On the other hand, when the flow state is the transient flow state, the valve body control unit 34 controls the movement of the spool 21*a* on the basis of the target flow rate value. The target flow rate value is calculated according to the operation command from the operation device 16. In other words, when the flow state is the transient flow state, the valve body control unit 34 performs open-loop control (feedforward control) based on the target flow rate value for control of the movement of the spool 21*a*. By performing the feedback control in the steady flow state or the like, it is possible to increase the flow rate accuracy in the steady flow state or the like. On the other hand, by performing the open-loop control in the transient flow state, it is possible to increase the stability of flow rate control in the transient flow state.

Furthermore, in the control device 17, the opening command limiting part 55 of the valve body control unit 34 limits the opening command. Subsequently, the pressure command calculating part 56 controls the movement of the spool 21*a* on the basis of the second pressure command. In this manner, the control device 17 can control the movement of the spool 21*a* on the basis of the target flow rate value by calculating the second pressure command according to the limited opening command. Thus, the flow of the operating fluid in the transient flow state can be controlled more stably.

Other Embodiments

The hydraulic system 1 according to the present embodiment is applied to construction equipment, but may be applied to an industrial vehicle such as a forklift or industrial equipment such as a press machine. In the hydraulic system 1 according to the present embodiment, only a single directional control valve 21 is connected to the hydraulic pump 11, but two or more directional control valves 21 may be connected thereto in parallel or in series. The hydraulic actuator connected to the directional control valve 21 is not limited to the hydraulic cylinder 2 and may be a hydraulic motor.

Furthermore, in the hydraulic system 1 according to the present embodiment, one example of the hydraulic actuator is the hydraulic cylinder 2, but the hydraulic actuator may be a hydraulic motor. Regarding the type of the hydraulic cylinder 2, the hydraulic cylinder 2 is not limited to a single-rod double-acting cylinder and may be a double-rod cylinder or a single-acting cylinder. Furthermore, the element included in the valve device 12 is not limited to the directional control valve 21 and may be any element as long as the size of the opening thereof can be adjusted using the valve body. The motion command is not necessarily limited to the pressure command and may be an electric current command.

Furthermore, the control device 17 does not necessarily need to include the flow rate estimation calculation unit 32. The control device 17 may include a flow rate obtainment unit, for example. In this case, in the hydraulic system 1, a flow rate sensor is provided in a channel connecting the directional control valve 21 and the hydraulic pump 11. The flow rate obtainment unit obtains a measured flow rate on the basis of the output result from the flow rate sensor. The opening command limit value calculation unit 33 determines the flow state on the basis of the measured flow rate obtained. Similarly, the opening estimation calculation unit 35 may also be an opening degree obtainment unit. In this case, in the hydraulic system 1, a stroke sensor is provided on the spool 21a. The opening degree obtainment unit obtains an estimated opening degree on the basis of the output result from the stroke sensor.

The valve body control unit 34 of the control device 17 controls the movement of the spool 21a on the basis of the target flow rate value by limiting the opening command in the transient flow state. However, the control performed by the valve body control unit 34 is not necessarily limited to this control. For example, a subject referred to by the valve body control unit 34 to calculate the pressure command can be switched between the opening command and the target flow rate value according to the flow state. Furthermore, the spool 21a may be controlled as follows. Specifically, the control device 17 calculates the first and second pressure commands on the basis of both the opening command and the target flow rate value. The valve body control unit 34 outputs one of the first and second pressure commands to the first and second electromagnetic proportional control valves 22L, 22R according to the determined flow state. With either control, the valve body control unit 34 can control the movement of the spool 21a on the basis of the opening command in the steady flow state or the like and control the movement of the spool 21a on the basis of the target flow rate value in the transient flow state.

Moreover, in the hydraulic system 1 according to the present embodiment, the spool 21a of the directional control valve 21 moves according to the pilot pressures from the electromagnetic proportional control valves 22L, 22R. However, the method for driving the spool 21a of the directional control valve 21 is not necessarily limited to this method. For example, the spool 21a of the directional control valve 21 may be driven using an electric motor via a direct-acting mechanism. In this case, the control device 17 controls the movement of the spool 21a via the electric motor.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1 hydraulic system
12 valve device
17 control device
21 directional control valve (spool valve)
21a spool
22L first electromagnetic proportional control valve
22R second electromagnetic proportional control valve
31 opening command calculation unit
32 flow rate estimation calculation unit (flow rate obtainment unit)
34 valve body control unit
35 opening estimation calculation unit (opening degree obtainment unit)
36 flow state determination unit
55 opening command limiting part
56 pressure command calculating part (command calculating part)

The invention claimed is:

1. A control device that controls movement of a valve body of a valve device, the control device comprising:
   a flow rate obtainment unit that obtains a flow rate of the valve device;
   a flow state determination unit that determines, on the basis of a target flow rate value and the flow rate, whether or not a flow of an operating fluid in the valve device is in a transient flow state, the target flow rate value being input to the flow state determination unit, the flow rate being obtained by the flow rate obtainment unit;
   an opening command calculation unit that calculates an opening command on the basis of the target flow rate value and an upstream-downstream pressure difference of the valve device; and
   a valve body control unit that controls the movement of the valve body, wherein:
   when the flow state determination unit determines that the flow is not in the transient flow state, the valve body control unit controls the movement of the valve body on the basis of the opening command, and when the flow state determination unit determines that the flow is in the transient flow state, the valve body control unit controls the movement of the valve body on the basis of the target flow rate value independently of the upstream-downstream pressure difference of the valve device.

2. The control device according to claim 1, further comprising:
   an opening degree obtainment unit that obtains an opening degree of the valve device, wherein:
   the flow rate obtainment unit obtains, as the flow rate of the valve device, a flow rate estimate based on the upstream-downstream pressure difference and the opening degree obtained by the opening degree obtainment unit.

3. The control device according to claim 1, wherein:
   the valve body control unit performs feedback control based on the opening command for control of the movement of the valve body to be performed when the flow state determination unit determines that the flow is not in the transient flow state, and the valve body control unit performs open-loop control based on the target flow rate value for control of the movement of the valve body to be performed when the flow state determination unit determines that the flow is in the transient flow state.

4. The control device according to claim 1, wherein:
   the valve body control unit calculates a motion command for controlling the movement of the valve body and outputs the motion command to the valve device to control the movement of the valve body; and
   when the flow state determination unit determines that the flow is not in the transient flow state, the valve body control unit calculates, on the basis of the opening command, a first motion command that is the motion command, and when the flow state determination unit determines that the flow is in the transient flow state, the valve body control unit calculates, on the basis of the target flow rate value, a second motion command that is the motion command.

5. The control device according to claim 4, wherein:
   the valve body control unit includes an opening command limiting part and a command calculating part;
   when the flow state determination unit determines that the flow is in the transient flow state, the opening command limiting part limits the opening command to a limit value that is set according to the target flow rate value; and the command calculating part calculates the second motion command on the basis of the opening command limited by the opening command limiting part.

6. The control device according to claim 4, wherein:

the valve body control unit causes the motion command to transition at a rate of change less than or equal to a predetermined limited rate of change upon switching of the motion command from the first motion command to the second motion command.

7. The control device according to claim 1, wherein:

the flow state determines calculates a difference between the target flow rate value and the flow rate, and when the difference is outside a predetermined range, determines that the flow of the operating fluid in the valve device is in the transient flow state.

8. A hydraulic system comprising:

the control device according to claim 1; and the valve device including at least one electromagnetic proportional valve and a spool valve, wherein:

the spool valve includes a spool that is the valve body;

the spool travels according to a pilot pressure acting on the spool;

the at least one electromagnetic proportional valve outputs the pilot pressure acting on the spool; and when the flow state determination unit determines that the flow is not in the transient flow state, the valve body control unit controls the movement of the valve body by causing the at least one electromagnetic proportional valve to output the pilot pressure that corresponds to the opening command, and when the flow state determination unit determines that the flow is in the transient flow state, the valve body control unit controls the movement of the valve body by causing the at least one electromagnetic proportional valve to output the pilot pressure that corresponds to the target flow rate value.

* * * * *